(12) United States Patent
Kuukankorpi et al.

(10) Patent No.: US 7,130,305 B2
(45) Date of Patent: Oct. 31, 2006

(54) PROCESSING OF DATA PACKETS WITHIN A NETWORK ELEMENT CLUSTER

(75) Inventors: Arttu Kuukankorpi, Helsinki (FI); Joni Pajarinen, Espoo (FI); Christian Jalio, Espoo (FI); Marko Nippula, Espoo (FI)

(73) Assignee: Stonesoft Oy, Helsinki (FI)

( * ) Notice: Subject to any disclaimer, the term of this patent is extended or adjusted under 35 U.S.C. 154(b) by 1169 days.

(21) Appl. No.: 09/898,211

(22) Filed: Jul. 2, 2001

(65) Prior Publication Data
US 2003/0002494 A1 Jan. 2, 2003

(51) Int. Cl.
H04L 12/56 (2006.01)
(52) U.S. Cl. ............................ 370/392; 370/401
(58) Field of Classification Search ............ 370/386, 370/400, 401, 395.3, 395.31, 395.32, 389, 370/392; 709/203, 238, 218, 219, 217
See application file for complete search history.

(56) References Cited
U.S. PATENT DOCUMENTS 6,327,622 B1 * 12/2001 Jindal et al. ............. 709/228
6,370,584 B1 * 4/2002 Bestavros et al. ......... 709/238
6,665,304 B1 * 12/2003 Beck et al. ................ 370/401
2005/0141506 A1 * 6/2005 Aiken et al. ............... 370/392

* cited by examiner

Primary Examiner—Brian Nguyen
(74) Attorney, Agent, or Firm—Ronald Craig Fish, A Law Corp; Ron Fish

(57) ABSTRACT

Processing of data packets within a network element cluster having a plurality of network element nodes is described. The network element cluster has a cluster network address common to said plurality of nodes. Distribution decisions are determined for first data packets, a first data packet being a data packet initiating opening of a packet data connection to said cluster network address, according to predetermined criteria. For each node of the network element cluster those first data packets, which are to be processed in said particular node, are selected according to the distribution decisions. Node-specific lists about opened packet data connections for which a node is responsible are maintained, and using these node-specific lists second data packets, which are data packets relating to any opened packet data connection specified in a node-specific list, are processed. For each node of the network element cluster those second data packets, which relate to connections on the node-specific list of said particular node, are selected for processing.

34 Claims, 6 Drawing Sheets

PROCESSING OF DATA PACKETS WITHIN A NETWORK ELEMENT CLUSTER

BACKGROUND OF THE INVENTION

1. Field of the Invention

The invention relates to methods for distributing data packets of communication connections to nodes in network element clusters and to network element clusters, where such methods are applied. Especially, the invention is related to such a method as specified in the preamble of the independent method claim.

2. Description of Related Art

The public networks are presently being used more and more for sensitive and mission critical communications and the internal networks of various organisations and enterprises are nowadays connected to the public networks, Internet being one of them. Since the basic mechanisms of the public networks were originally not designed with secrecy and confidentiality in mind, public networks are untrusted networks. To protect an internal network, a special network element is usually used to connect the internal network to a public network. Typically such network element monitors the connections traversing the network element and possibly modifies the data packets of the connections according to predetermined rules. Methods such as network address translation (NAT) and protocol conversions are methods requiring that the data packets are modified in such network elements. Also other modifications on the data packets traversing the network element may be performed. This kind of network element is often called a security gateway or a firewall.

To ensure sufficient capacity of a firewall or a server, it is common to construct them as clusters of typically identical network elements. The identical or similar network elements forming a cluster are usually called nodes. FIG. 1 illustrates two examples of network element clusters. A security gateway or a firewall connecting a network 13 to a second network 10 is a cluster 14 of network elements 15a, 15b and 15c. As a comparison, network 11 is connected to the network 10 using single network element 12. A second example is a server cluster 17 having server nodes 18a, 18b and 18c. As a comparison, a server 16 is also presented in FIG. 1.

A cluster of network elements such as servers or firewalls includes typically a plurality of similar nodes. The nodes have a common network address, hereafter called a cluster network address, and connections are typically directed to the cluster by means of this cluster network address. Additionally, the nodes may have node-specific network addresses. In a cluster, where nodes have a common cluster network address, all nodes see all data packets arriving at the cluster and there has to be an arrangement for distinguishing which data packets belong to which node. That is, each node should process only those packets that are assigned to it and ignore other data packets. Therefore the data packets arriving at the cluster need to be distributed to different nodes of the cluster. Typically distributing is done so that every node filters all arriving data packets and decides for example on the basis of the plaintext header field(s) of the packet whether that particular node needs to process that particular packet.

Connections directed to a cluster of network elements are directed to different nodes of the cluster on the basis of predefined distribution criteria. An example of distribution criteria is use of hash functions: node-specific sets of hash values are allocated to the nodes and a hash value for a data packet is calculated using a predetermined hash function and certain header fields of the data packet. Typically the header fields that are used for calculating hash values for TCP/IP (Transfer Control Protocol/Internet Protocol) or for UDP/IP (User Datagram Protocol/Internet Protocol) are source address, source port, destination address and destination port.

When a data packet directed to the cluster network address arrives at the cluster, a hash value is calculated on the basis of some header fields of the data packet, and the resulting hash value defines which node processes the data packet. Typically, all nodes filter all arriving data packets by calculating hash values for them, and then decide on the basis of the hash values the data packets which belong to them. Also some other method than calculating hash may be used for distributing data packets.

Consider, as an example, server cluster 17 having two nodes 18a and 18b and the following situation, where distribution decision are made using a hash function. The employed range of hash values is, for example, A–F. Hash values A, B and C are allocated to node 18a and hash values D, E and F are allocated to node 18b. Connections are directed to the nodes 18a and 18b on the basis of hash values calculated for incoming packets.

For ensuring reliable operation it is typically required that all data packets of one connection, for example TCP connection, are handled by the same node. Otherwise the connection may fail. The header fields used in calculating hash values for data packets are selected so that data packets of a packet data connection have same header field values. Every data packet of one connection has same source address, source port, destination address and destination port, and therefore these header fields are often used. All data packets of a certain packet data connection result in hash value C, for example, and a data packet resulting in hash value C are always directed to node 18a.

Problems arise, if the hash values need to be reallocated dynamically within the nodes of the cluster 17, for example because a new node 18c is added to the cluster 17. Other reasons for reallocating the hash values may be for example load balancing or a node starting a procedure to go offline. Consider the above mentioned connection with hash value C handled in the node 18a. If node 18c is added to the cluster 17 and hash values are reallocated so that hash values A and B belong to the node 18a, hash values C and D belong to the node 18b and respectively hash values E and F belong to die node 18c, the hash value C does not belong to the node 18a anymore. Thus data packets of the connection, which is used here as an example, are not directed to the node 18a anymore, and the connection fails.

Clustering functionality is typically implemented by means of separate clustering module, which is typically software running in the same device (computer) with the application to be clustered. Clustering module and the application to be clustered are running on top of some operating system (OS). FIG. 2 illustrates the server cluster 17 in more detail. The gateway or firewall cluster 14 may be implemented in a similar manner. In the server cluster 17, each node 18 comprises operating system 20 and the clustered application 22. The operating system may be divided into lower level and higher level portions 20a and 20b. For example, the higher level may include IP, TCP and UDP functionality and the lower level may include network interface. Furthermore, the nodes may include a firewall component 23. The clustered application may be, for example, WWW- or WAP-server application. Typically these programs 20 and 22 are similar in each node 18, and the clustered application 22 does not need be aware of the clustering; the application 22 runs independently in each node. The clustering software 21 is responsible for distributing the arriving data packets to the clustered application in the correct node.

SUMMARY OF THE INVENTION

An object of the invention is to realize such a method for processing data packets within a network element cluster, which allows flexible load sharing and balancing between the nodes of a network element cluster and provides enhanced reliability for packet data connections. A further object is to present a node of a network element cluster and a network element cluster, where flexible load balancing and load sharing is possible.

The invention is characterized by that which is specified in the appended independent claims. The appended dependent claims describe some preferred embodiments of the invention. The features described in one dependent claim may be further combined with features described in another dependent claim to produce further embodiments of the invention.

In a method in accordance with the invention, node-specific lists of connections, for which each node of a cluster is responsible, are maintained. A data packet, which initiates opening of a new connection, is processed in a node determined by a distribution decision according to predetermined criteria. These first data packets are thus distributed to the cluster nodes. A data packet, which relates to an opened packet data connection, is processed in that node in whose connection list the opened packet data connection is specified.

Determining distribution decisions and determining in which node a data packet is processed may be implemented, for example, by using a hash function. Advantageously, to each node in a network element cluster is allocated a separate set of hash values, hash values are calculated for data packets using certain fields of a data packet. The data packets, for which distribution decisions are determined, are processed in nodes of the network element cluster according to the calculated hash values. Various different hash functions may be used, as is known to a man skilled in the art.

By maintaining the node-specific lists of opened packet data connections it is possible to update the predetermined distribution criteria typically without loosing any connections. Even in a situation, where the predetermined distribution criteria are updated and the node-specific hash value ranges, for example, change, a node continues to process those data packets, which relate to opened packet data connections in the node-specific connection list. As long as a packet data connection is on a node-specific list, the corresponding node processes the data packets relating to this packet data connection—irrespective of the hash values allocated to that node (or other updated distribution criteria).

One advantage of the invention is thus that is allows updating the distribution criteria without typically loosing any opened packet data connections. A further advantage is that it allows gracious shut down of a node in a cluster. In a shut down situation, typically first the distribution criteria are modified so that a node does not obtain any new packet data connections. Thereafter the node is kept operational until the packet data connections in its connection list are closed. Once the last packet data connection, for which the node is responsible, is closed, the node may be shut down without disturbing packet data connections.

The reason for changing the distribution criteria may be, for example, that the load is not in balance between the nodes, a new node is added to the cluster or a node is to be removed from the cluster.

BRIEF DESCRIPTION OF THE DRAWINGS

Various embodiments of the invention will be described in detail below, by way of example only, with reference to the accompanying drawing, which

DETAILED DESCRIPTION OF THE INVENTION

Figure 1:
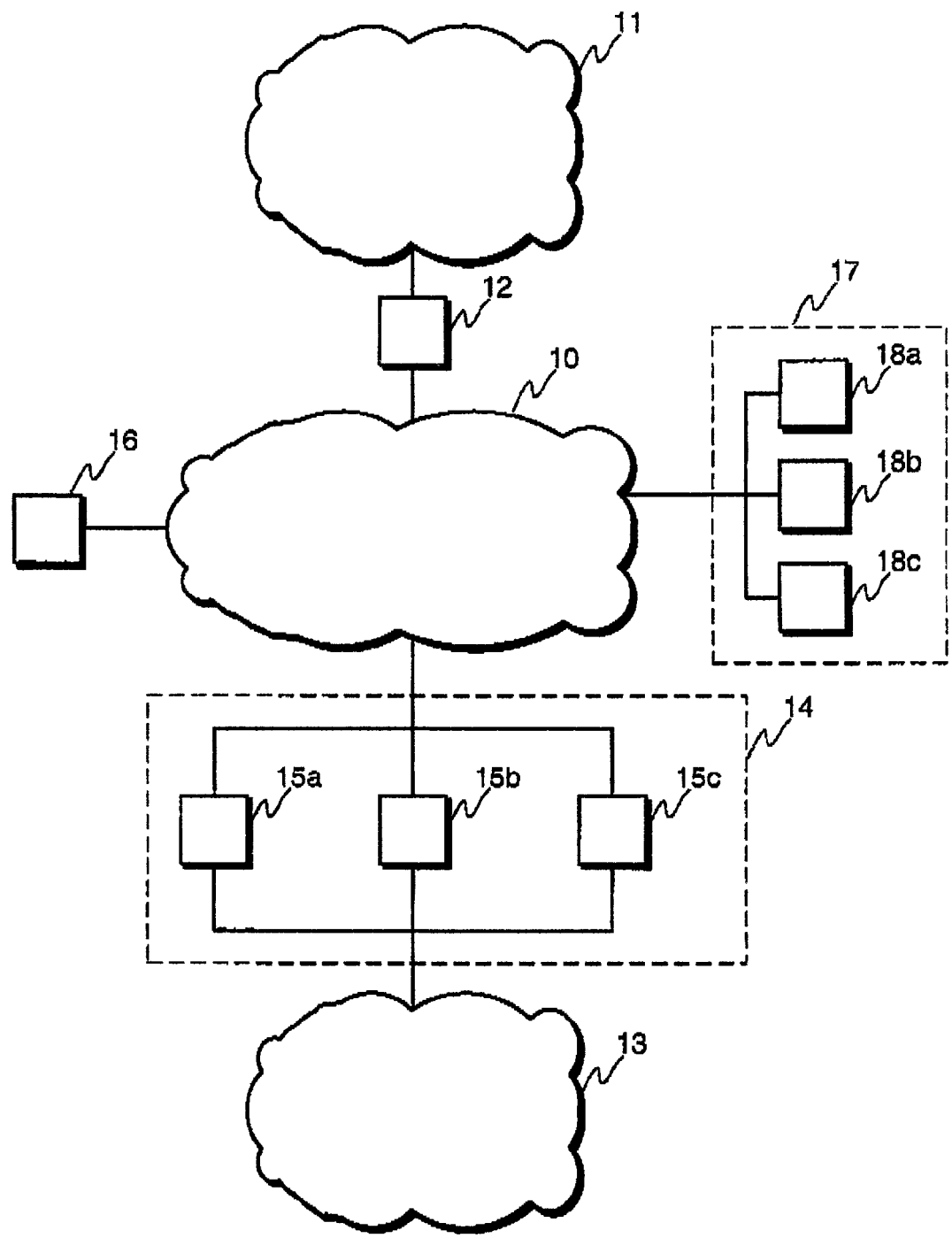
FIG. 1 illustrates examples of network element clusters.
Figure 2:
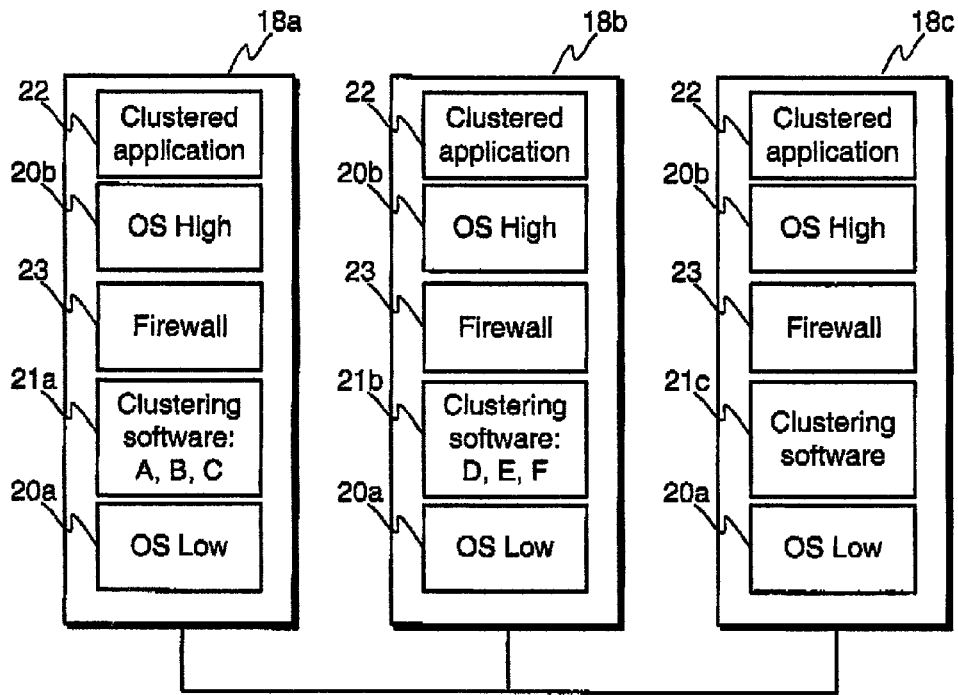
FIG. 2 illustrates schematically clustering program for a node in a network element cluster.

FIGS. 1 and 2 are discussed in more detail above in connection with the prior art description.

Typically the fields of data packets that are used for determining distribution decisions are header fields, but also other fields may be used. Hash functions are widely used for determining distribution decisions and distributing data packets. Advantageously, to each node in a network element cluster is allocated a separate, node-specific set of hash values; hash values are calculated for data packets using certain fields of data packets; and such data packets, which initiate opening of packet data connections, are distributed to nodes of the network element cluster according to the calculated hash values. Hash functions are described in more detail later in this document, and the invention is described in conjunction with hash functions. Nevertheless, the invention is not limited to only the use of hash functions, but also other suitable functions may be used.

Said predetermined criteria are typically information about what information in data packets is used for determining distribution decisions and about how this information is used. Information about hash function to be used and/or the field(s) of data packets to be used may be included. The predetermined criteria also typically indicate the way in which a range of hash values is allocated to nodes as node-specific hash value sets. As discussed above, in many cases it is advantageous to reallocate the node-specific hash value sets, that is, to update the predetermined criteria.

A hash function h is a function mapping a certain domain to a certain range, where the size of the range is typically much less than the size of the domain. A typical feature of a hash function is that it distributes input values, which are close to each other in the domain, evenly to the range. Therefore small changes in the input values may result in large changes in the corresponding hash values. In this description the domain and range typically consist of integer numbers, and the size of the domain is typically $2^M$ and the size of the range is typically $2^N$. The range size is typically selected so that $2^N$ is considerably larger than the number of nodes in a network element cluster. This way the hash function provides load sharing between the nodes of the network element cluster. For example, 256 hash values (i.e. N=8) may be suitable for a few nodes in a network element cluster. Also a smaller amount of hash values may be sufficient. Hash functions or other functions suitable for making distribution decisions are known to a man skilled in the art.

In the following, several embodiments for implementing the invention are described. The embodiments are described as examples only and any corresponding solution for implementing the invention may be used. Accordingly features of any embodiment may be combined with features of some other embodiment. It is clear from the wide range of different embodiments of the invention that the invention can be applied in various ways, and that only some possibilities are described herein.

Figure 3:
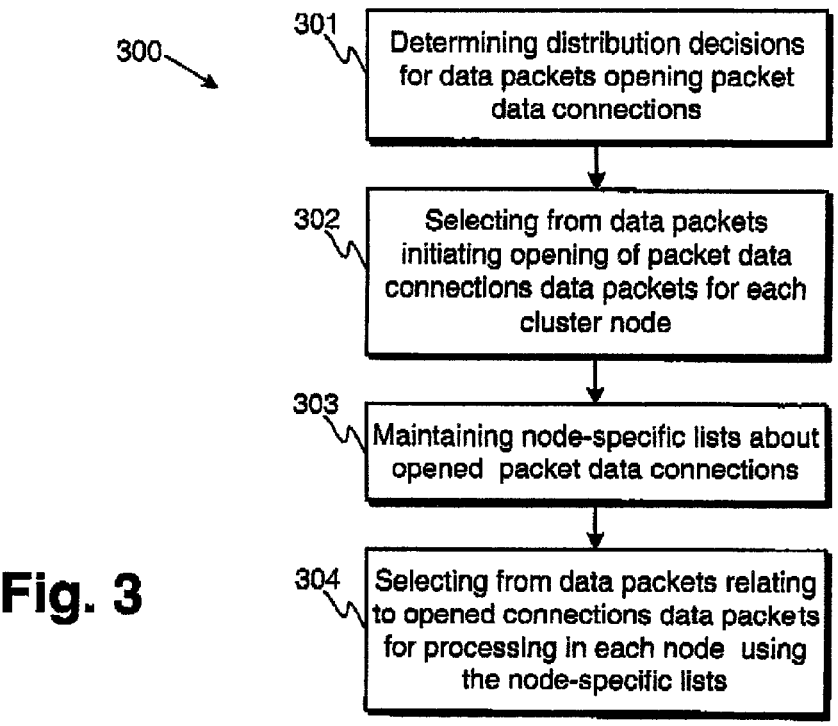
FIG. 3 illustrates as an example a flowchart of a method according to the invention, schematically examples of data packets and header fields, which are suitable for use in accordance with the invention.

FIG. 3 illustrates a method 300 according to the invention. When a data packet, which initiates opening of a packet data connection, arrives at the network element cluster, a distribution decision is determined in step 301 for the data packet according to predetermined criteria. Thereafter data packets to be processed in each node of the network element cluster are selected in step 302 from the data packets initiating opening of a packet data connection. This selection is performed according to the distribution decisions determined for the data packets. Node-specific lists about opened packet data connections for which a node is responsible are maintained in step 303. Data packets for each node of the network element cluster are selected in step 304 from data packets relating to opened packet data connections specified in node-specific lists. These data packets are processed in that node, in whose node-specific list the opened packet data connection is specified.

Term node-specific connection list does not refer to any specific data structure. A node-specific connection list may be implemented as any suitable data structure. It may be, for example, a table or an ordered list.

Typically a connection list is a data structure having an entry corresponding to each opened packet data connection. An entry specifying an opened packet data connection typically comprises values of some data packet header fields, which identify data packets relating to a certain packet data connection. Typically these header fields are the destination address, source address, destination port and source port. It is possible to use alternatively or additionally also other header fields. By comparing header fields of a data packet, which is not a data packet initiating opening of a new packet data connection, to the entries in a node-specific connection list it is easy to determine, if that node is responsible for processing the arriving data packet.

Typically an entry specifying a packet data connection is added to a node-specific connection list, which may be any suitable data structure when a data packet initiating the opening of the packet data connection is received in a network element cluster. It is necessary that obsolete entries are removed from a node-specific connection list, otherwise the connection lists grow uncontrollably.

One way of removing obsolete entries is to refresh the node-specific connection list every now and then, for example every 30 seconds. The refresh process may be triggered by a timer and for the time of the refresh typically no new connections are accepted. The refresh is done by obtaining information about tie currently open connections from the operating system and using this information for constructing a new node-specific connection list, which replaces the previous connection list. The operating system, and more specifically, the higher portion 20b of the operating system in FIG. 2, maintains a list of open connections. Thus obtaining a list of current connection from the operating system results in replacing the connection list of the clustering module with a list of currently open connections and discarding possible old connections.

This approach causes problems, if the application to be clustered resides at a lower level than the portion of the operating system maintaining the list of currently open connections and alters the identifiers of a packet data connection. In that case the list of current connections maintained in the operating system may contain different information from the node-specific connection list of the clustering module. This is the case especially with proxy-type firewall applications. For example, some firewalls modify the destination address field of data packets in order to direct the data packets to the firewall's proxy. The address in the operating system's list of current connections is the modified address, but the clustering module sees the original destination address. Thus this destination address field appears to be different in the operating system's list and in the clustering module's list. Any changes by the application that modify identifiers of a connection (that is header fields of data packets relating to a connection) will cause a connection to be cut when the refresh takes place. The reason for this is that an incoming packet from a particular connection cannot be identified as a connection of the handling node, because the refresh has yielded different information. Regarding the common four header fields (source and destination addresses and source and destination ports) used for identifying connections, this solution works, if only one identifier is modified and it is known which of the identifiers is modified. In this case it is possible to identify connections by only three of the four identifiers.

Additionally, obtaining the list of current connections from an operating system is operating system dependent. Furthermore, clustering modules are typically also clustered application —specific, due to some applications modifying some fields of the data packets and some applications modifying some other fields. This way of maintaining a list of opened packet data connections is thus applicable typically in some specific situations.

Figure 4:
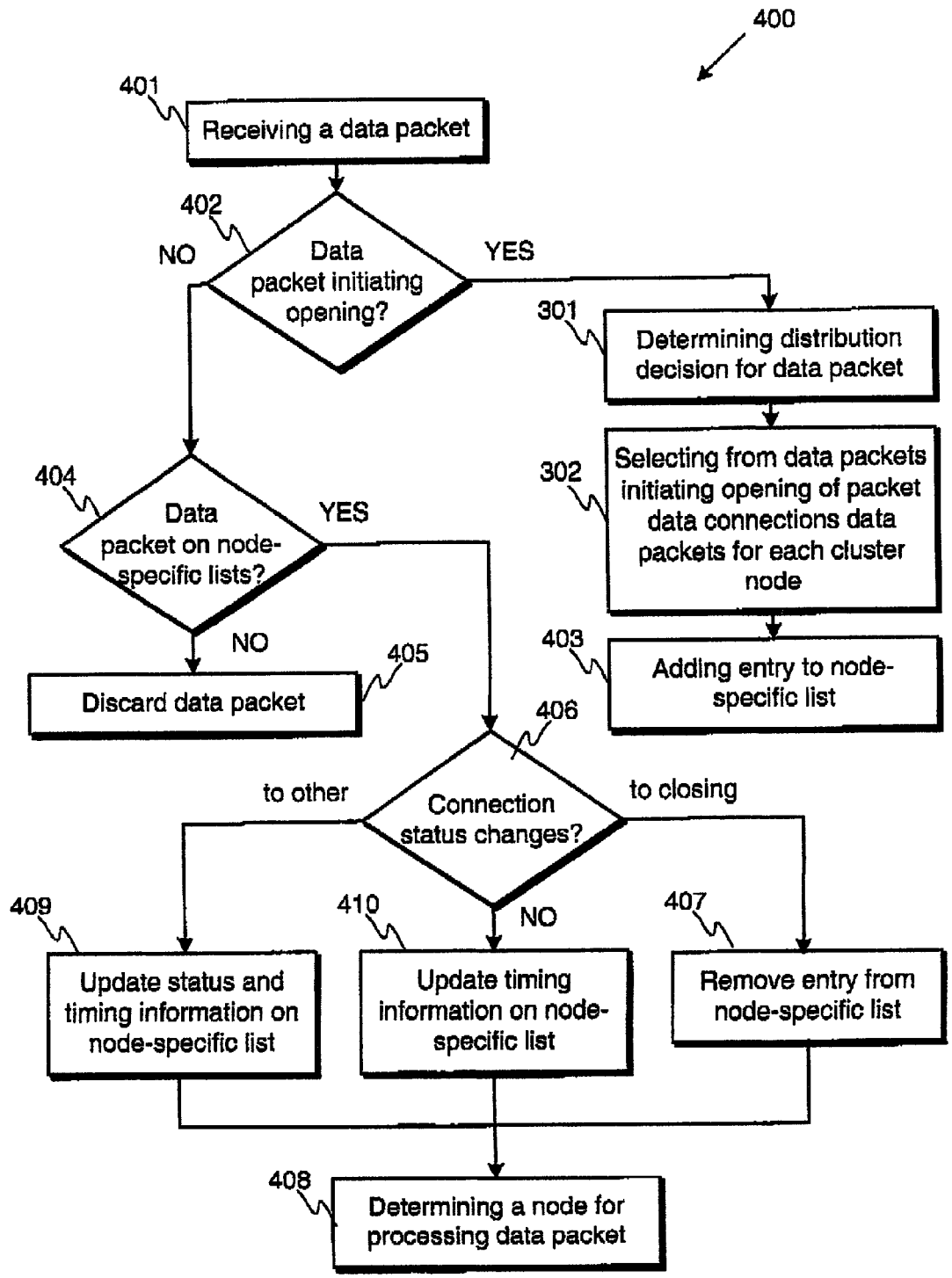
FIG. 4 illustrates as an example a flowchart of a method according to a first preferred embodiment of the invention.

FIG. 4 illustrates an example of a second solution of maintaining node-specific opened connections lists: a flowchart of a method according to a first preferred embodiment of the invention. Here at least incoming data packets, which relate to already opened packet data connections, are monitored to detect at least data packets relating to closing of a packet data connection. It may be advantageous to monitor data packets flowing in both directions, e.g. data packets to and from a client, as a closing dialog may be initiated typically by either of the connection end points.

Consider, as an example, a TCP connection. A data packet initiating the opening of a TCP connection is a SYN packet, and a data packet relating to the closing of a TCP connection is either a FIN packet or a RST packet.

An entry in a connection list may further comprise information indicating a status of an opened packet data connection. The status of a connections may be, for example, OPENING, ESTABLISHED or CLOSING. When an entry is made to the connection list on the basis of a data packet initiating the opening of a packet data connection, the status field of the entry may be set to OPENING. When a first regular data packet relating to the same packet data connection is received, the status of the corresponding entry in a connection list may set to ESTABLISHED. When a data packet relating to the closing of an opened packet data connection is received the status of the corresponding entry in a connection list may set to CLOSING. Advantageously the predetermined time periods for removing an entry from connection list may be status specific. For updating status information in a connection list, typically all incoming data packets are monitored and it is checked if these data packets change the status of an opened connection.

For determining the status of a connection, also the packets that are going out from the network node may be used. For example, the outgoing data packets may be used for verifying that the status of the connection was interpreted correctly on the basis of the incoming data packets.

Connections which are lost or cut—and which therefore are not closed with a proper closing dialog—are advantageously removed from node-specific connection lists by timeouts. This means, for example, that each entry in a connection list contains information about the arrival time of the latest data packet relating to the opened packet data connection. It is possible that the arrival time is indicated in the entry, and when the time lapsed since that latest arrival time exceeds a predetermined threshold, the entry is removed from the node-specific connection list. The arrival times in the entries may be check, for example, periodically. In this case, the timing information indicates indirectly how long an opened packet data connection is still valid. Alternatively, it is possible to indicate directly the threshold in an entry. In this case, it is possible to decrease the timing information in entries periodically and when timing information in an entry reaches zero, for example, the entry is removed from the node-specific connections list. Timing information in this case indicates directly how long an opened packet data connection is still valid.

In method 400 an arriving data packet is received in step 401. It is first checked in step 402, if the arriving data packet is a data packet initiating the opening of a packet data connection. If it is, then a distribution decision is determined in step 301 for the data packet, the data packet is selected to be processed in a node specified by the distribution decision, and an entry specifying the opened packet data connection is added in step 403 to the node-specific connections list of the proper node. This step 403 forms part of maintaining node-specific connection lists.

If the arriving data packet is not a data packet initiating opening of a packet data connection, it is checked in step 404, if the data packet is a data packet relating to one of the opened connections. If it is not, the data packet may be discarded (step 405). If the data packet relates to one of the opened connections, it is checked in step 406 if it is a data packet changing the status of the relating packet data connection. In other words, data packets, which do not initiate opening of a packet data connection, are monitored in step 406. If the data packet causes the status of the connection to change to CLOSING, an existing corresponding entry is removed in step 407 from a node-specific connection list. If the data packet otherwise changes the status of the packet data connection, status information and timing information for determining how long an entry is valid is updated in a corresponding connection list entry in step 409. If the data packet does not cause a change to the status of the packet data connection, timing information is updated in step 408.

Thereafter a node for processing the data packet is determined in step 408. The node is that node, in whose node-specific connection list the connection is specified, and step 408 forms part of step 304, Consider, for example, TCP data packets. A data packet initiating the opening of a TCP connection is a SYN packet and a closing data packet is either a FIN or RST packet. Further consider an example, where the threshold time period since the arrival of the latest data packet for removing the entry is used as timing information. Advantageously, the time value associated with OPENING is shorter than the value associated with ESTABLISHED in order to avoid the possibility to maliciously overload the clustering modules with a large amount of entries corresponding to SYN packets. When a connection is established it is safer to maintain each entry for a longer time in the connection lists. When a FIN or RST packet is received the entry's status is changed to CLOSING with a shorter CLOSING timeout.

Method 400 may alternatively be such that only data packets relating to closing of a packet data connection are looked for in step 406. In this case step 409 is not needed. Furthermore, it is possible that the data packets, which do not initiate opening of a packet data connection, are not monitored. In this case steps 406, 407 and 409 are not needed; only timing information is updated in step 410. Entries from the connection lists are removed as specified by a timeout. Method 400 illustrated in FIG. 4 typically is in many situations more applicable than these simpler modifications, which—on the other hand—may require a bit less processing capacity.

A further solution for removing obsolete entries from the node-specific connection lists is described next. In this solution, the obsolete entries are removed after a certain—advantageously status-specific—time period since the arrival of the latest data packet has elapsed. The data packets may be monitored for allowing the time period for removing an entry be status-specific. If it is sufficient to use a constant time period, there is no need to monitor data packets, which do not initiate packet data connections, in this solution.

Figure 5:
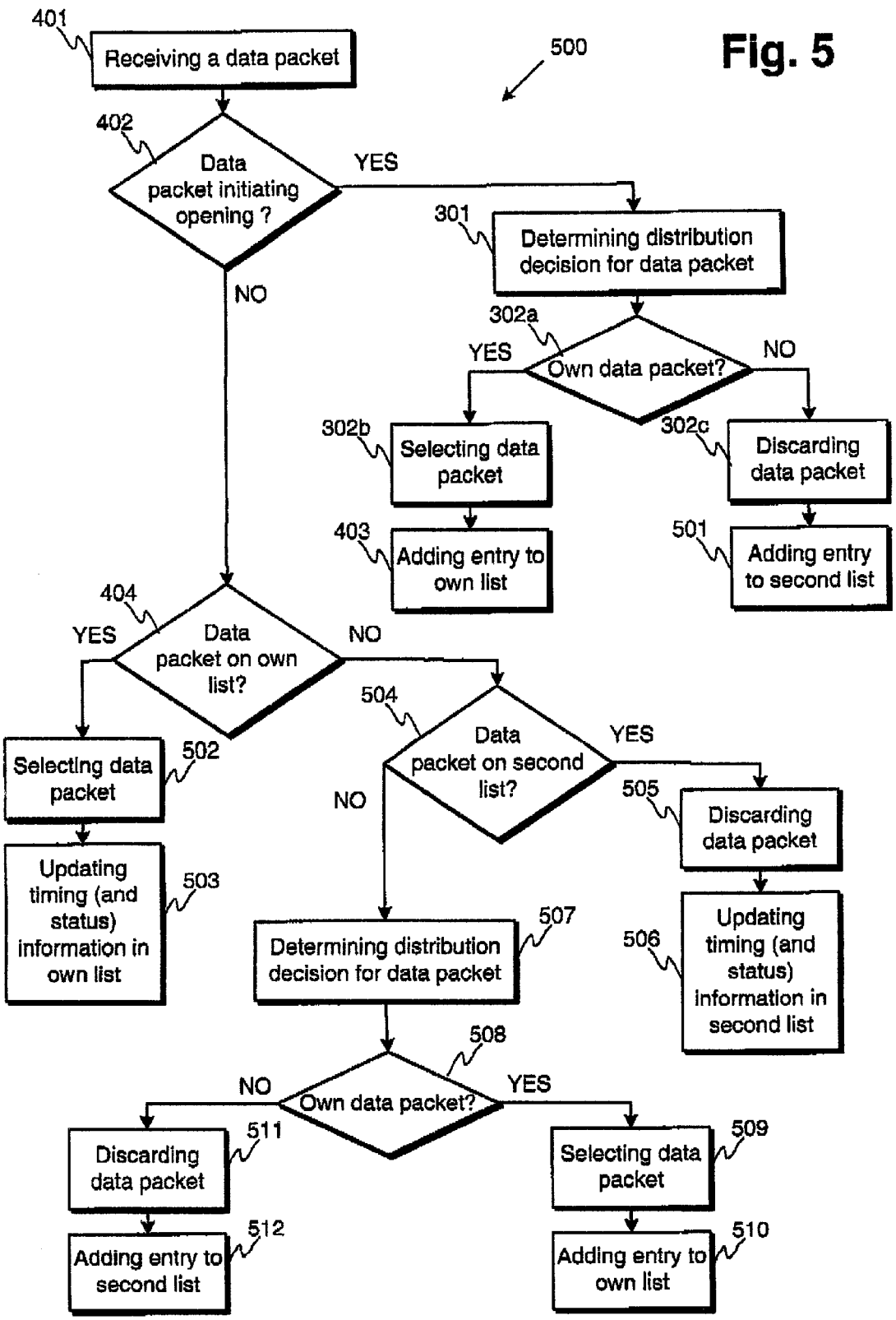
FIG. 5 illustrates as an example a flowchart of a method according to a second preferred embodiment of the invention.

FIG. 5 illustrates a flowchart of such a method 500 according to a second preferred embodiment of the invention. Here two separate connection lists are maintained for each node: a first node-specific list specifying the node's own opened packet data connections and a second node-specific list specifying the opened packet data connections, which other nodes in the cluster are processing. Method 500 describes the actions in a node of a network element cluster.

In step 401 of method 500 a data packet arrives. Similarly as in method 400, it is checked in step 402, if the data packet is a data packet initiating the opening of a packet data connection. After a distribution decision is determined for such a data packet in step 301, an entry is added either to the first node-specific list (step 403) or to the second node-specific list (step 501). The data packet is either selected for processing in the node (step 302b) or discarded (step 302c), depending on the distribution decision.

If the data packet is a data packet relating to a packet data connection on the first node-specific connection list (step 404), then the data packet is selected for processing in this node (step 502). Timing information—and possible status information, if the data packets are monitored—is updated in step 503 in the corresponding entry in the first node-specific connection list.

If the data packet is a data packet relating to a packet data connection on the second node-specific connection list (step 504), then the data packet is discarded (step 505), for processing in this node (step 502). Timing information—and possible status information, if the data packets are monitored—is updated in step 506 in the corresponding entry in the second node-specific connection list.

If the data packet is a data packet, for which there is no entry on either the first or the second node-specific connection lists, the data packet is treated similarly as a data packet initiating the opening a new packet data connection. This case may arise if an entry in a connection list is removed because the time period since the arrival of the latest data packet has been too long and, for example, a periodically occurring connection list checking has removed the entry either from the first node-specific connection list or from the second node-specific connection list of this node. A distribution decision is determined for the data packet in step 507. If the distribution decision is such that this node is responsible for processing the packet, for example a hash value of the data packet is one of the hash values allocated to this node, the packet is selected for processing in this node in step 509 and a corresponding entry is added to the first node-specific connection list in step 510. If the data packet is to be processed by another node, the data packet is discarded in this node (step 511) and a corresponding entry is added to the second node-specific connection list (step 512). When adding entries in steps 510 and 512, the type of the data packet typically determines the status information in the entry.

When a new node joins a cluster according to the second preferred embodiment of the invention, the node starts to collect connections to its own connections list. Additionally, the node asks for the own connections list and the other connections list from some other node and merges the information in them to its other connections list. The own connections list and the other connections list of any one of the nodes includes the connections that are already opened before the new node is added to the cluster. They are connections that should not be processed by the new node and therefore they are added to the other connections list of the new node. This way already opened connections continue to be handled by the same node also after reallocation of the hash values. The only thing that might cause problems after reallocation of hash values is that if some entry gets unintentionally removed from the connection list and hash value needs to be calculated to a non-SYN packet. If the hash corresponding to that specific connection is reallocated to some other node after opening the connection, the rest of the packets of the connection would be accepted for processing in some other node than the node that started to process the connection. This situation would result in failing the connection. However, the probability of this situation is marginal because it requires both a change in load balancing filter and a connection idle for longer than the ESTABLISHED timeout.

Advantageously each node of a network element cluster has a node-specific network address. Packet data connections, which are initiated by a node, typically use a node-specific network address. Arriving data packets, in whose header fields a node-specific network address is specified, are then processed in the same node. A cluster network address and node-specific network addresses are typically used, for example, in proxy server clusters: a client identifies a proxy server cluster using the cluster network address and a node in the proxy server cluster, when opening a connection to a second server, uses the node-specific network address.

Figure 6:
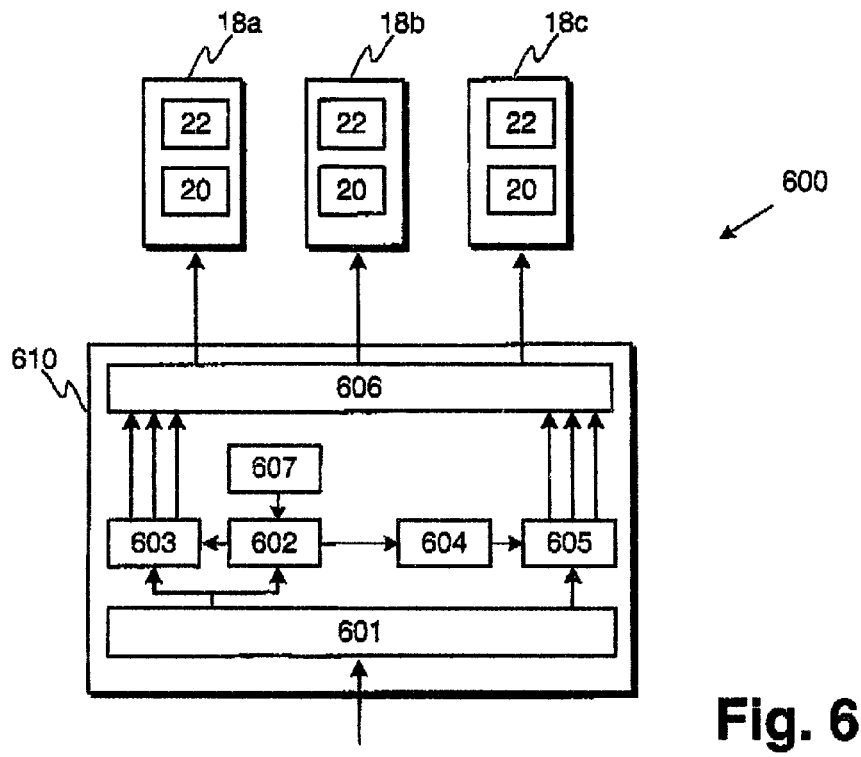
FIG. 6 illustrates schematically a first example of a cluster of network elements in accordance with the invention.

In the appended claims directed to methods or clusters and in the discussion relating to FIG. 6 the following terms are used. A first data packet is a data packet initiating the opening of a packet data connection in any of the nodes of a cluster. A second data packet is a data packet of a packet data connection, which is specified in a node-specific connection list of any of the nodes of a cluster. A third data packet is a data packet, which is neither a first data packet nor a second data packet.

FIG. 6 illustrates schematically as a first example a cluster 600 of network elements in accordance with the invention. In this cluster 600, there is a plurality of network element nodes 18. These network element nodes typically need not be aware of the other nodes in the cluster. In the cluster 600, there is—as an example—a separate network element 610, where the clustering functionality is implemented. It must be appreciated that the clustering functionality may also be included in each network element node 18. In that case no separate network element 610 is needed.

In FIGS. 6–9 the flow of data packets is illustrated with thicker vertical arrows. Thinner horizontal arrows illustrate, as examples, typical interactions of various means.

The network element 610 connects the cluster to a network and it has means 601 for receiving data packets relating to the cluster network address of the cluster. Typically all data packets addressed to the cluster network address are received by the network element 610. The network element 610 further has means 602 for determining distribution decisions for received first data packets, a first data packet being a data packet initiating opening of a packet data connection to said cluster network address, according to predetermined criteria. TCP SYN packets are an example of first data packets. Means 603 are means for selecting from said first data packets for each node of the network element cluster those first data packets, which are to be processed in said particular node according to the distribution decisions. Node-specific lists about opened packet data connections for which a node is responsible are maintained in means 604 for maintaining said node-specific lists. Means 605 for selecting from received second data packets, a second data packet being a data packet relating to an opened packet data connection specified in a node-specific list, for each node of the network element cluster those second data packets, which relate to connections on the node-specific list of said particular node. The network element 601 further has means 606 for sending to each node 18 of said network element cluster 600 data packets selected for the particular node.

Means 602–605 are typically provided as a computer program or computer program components. It is clear to a person skilled in the art, how to provide means 601 for receiving packets and means 606 for sending packet to other nodes. The cluster 600 may further comprise means 607 for updating the predetermined distribution criteria, for example, for re-allocating hash values between the nodes 18.

The network element 610 and means therein may be arranged to operate in accordance with any method according to the invention. Examples of such methods are those discussed above in detail.

Figure 7:
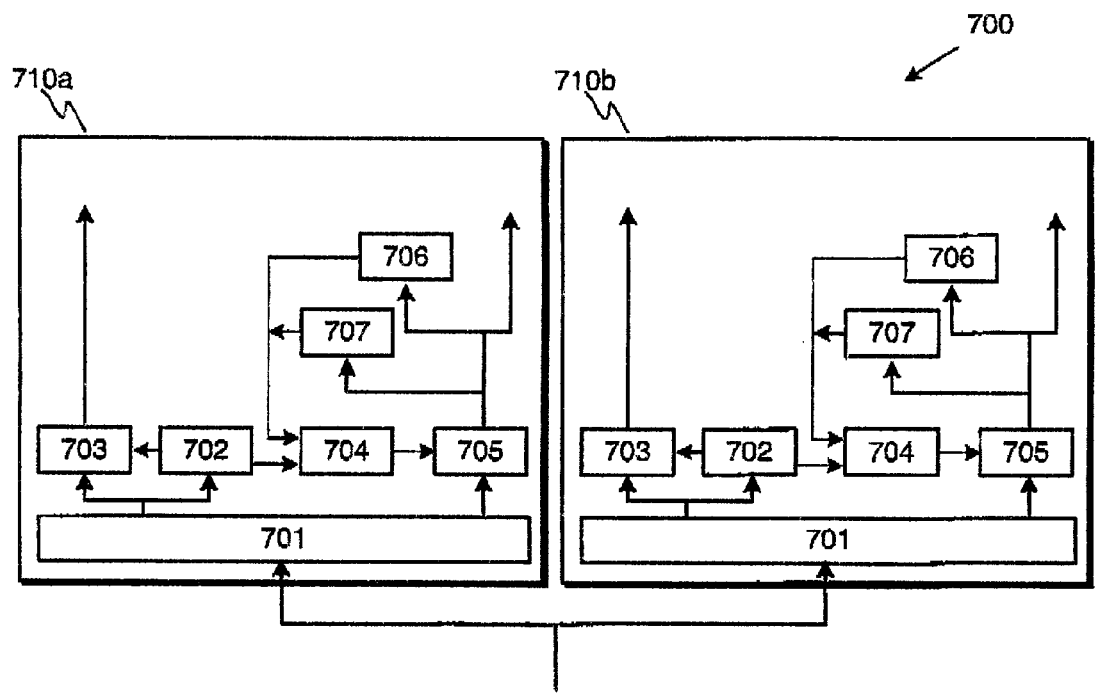
FIG. 7 illustrates schematically a second example of a cluster of network elements according to the invention, the network elements in said cluster being network elements in accordance with the invention.

FIG. 7 illustrates schematically a second example of a network element cluster 700 in accordance with the invention. This cluster 700 has a plurality of network elements 710 in accordance with the invention, the network elements 710 applicable for constructing a network element cluster.

In the description below, a first data packet is a data packet initiating the opening of a packet data connection in the particular network element (node) in question according to a distribution decision determined for that data packet. A second data packet is a data packet relating to an opened packet data connection specified in the connection list of the particular network element (node). A third data packet is a data packet initiating the opening of such a packet data connection, which is to be specified in the other connections list of this network element (node) according to a distribution decision determined for that data packet. A fourth data packet is a data packet relating to an opened packet data connection specified in the other connections list of this network element (node).

Furthermore, there may be data packets, which do not initiate opening of a packet data connection but which are specified neither on the own connection list (just plain "list" below and in the appended claims directed to a network element) nor on the other connections list ("second list" below and in the appended claims directed to a network element). A fifth data packet is a data packet, which is neither a first, second, third or fourth data packet, but it is a data packet to be processed in this network element (node) according to a distribution decision for the data packet. A sixth data packet is a data packet, which is neither a first, second, third or fourth data packet, nor a data packet to be processed in this network element (node) according to a distribution decision for the data packet. In other words, using the method 500 as an example, fifth data packets would be processed in steps 509 and 510 and sixth data packets in steps 511 and 512.

A network element 710 is a network element adapted to serve as a node in a cluster of network element. Such a cluster has typically a plurality of similar network element nodes and a cluster network address common to said plurality of network element nodes. A network element 710 comprises means 701 for receiving data packets; means 702 for determining distribution decisions for at least some of received data packets according to predetermined criteria; and means 703 for selecting, based on distribution decisions, from those received data packets, which are data packets initiating opening of packet data connection to said cluster network address, first data packets for processing in the network element. It further comprises means 704 for maintaining a list about opened packet data connections in the network element and means 705 for selecting, based on said list, from received data packets second data packets, a second data packet being a data packet relating to an opened connection on said list, for processing in the network element A network element 710 may further comprise means 705 for updating said predetermined criteria.

As FIG. 7 illustrates, a network element 710 may further comprise means 706 for detecting such a second data packet, which is a data packet relating to closing of a packet data connection. In this case, the means 704 for maintaining said list is typically arranged to add an entry representing an opened packet data connection to said list, when a first data packet is selected for processing in the network element; and to remove an entry from said list, when a second data packet relating to closing of a packet data connection is detected. The means 704 are typically furthermore arranged to remove an entry from said list, when a predefined time period from the arrival of the latest data packet relating to said entry is exceeded. In this case, entries of said list typically comprise timing information for determining how long an entry is valid.

In a network element 710 having means 701–705, entries of said list may comprise timing information for determining how long an entry is valid. In this case said means 704 for maintaining said list is typically arranged to add an entry representing an opened packet data connection to said list when a first data packet is selected for processing in the network element; update said timing information at least when a second data packet is selected; and remove an entry from said list, when a predefined time period from the arrival of the latest data packet relating to said entry is exceeded. The network element may further comprise means 707 for determining the status of an opened packet data connection, wherein entries of said list comprise status information and said means 704 for maintaining said list is arranged to update said status information according to a determined status. The predefined time period for removing entries from the list may be status specific.

Figure 8:
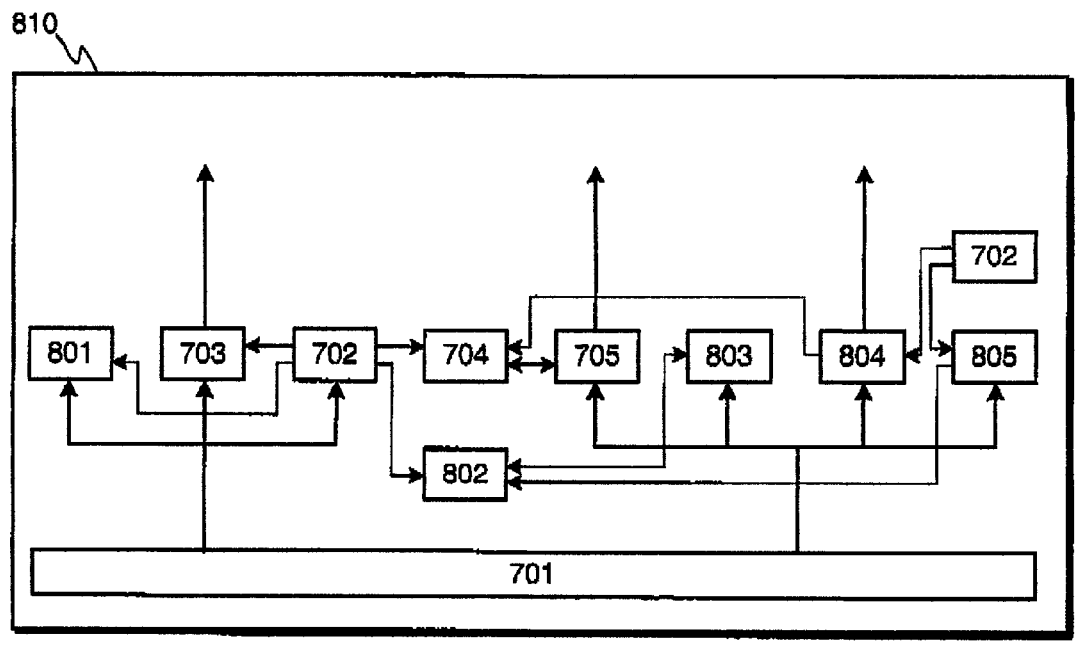
FIG. 8 illustrates schematically an example a network element in accordance with the invention.

FIG. 8 illustrates a further example of a network element in accordance with the invention. This network element 810 is a network element in accordance with the second preferred embodiment of the invention, where a list of those connections, for which a node is responsible and a second list of connection for which other nodes of a cluster are responsible, are maintained. In addition to means 701–705 the network element 810 further comprises the following means:

means 801 for detecting, based on distribution decisions according to predetermined criteria, from received data packets, which are data packets initiating opening of packet data connections, third data packets to be processed in at least a second network element;

means 802 for maintaining a second list about opened packet data connections in said at least second network element:

means 803 for detecting from received data packets fourth data packets, a fourth data packet being a data packet relating to an opened connection on said second list;

means 804 for selecting, based on distribution decisions, from received data packets fifth data packets, a fifth data packet being a data packet relating to said cluster network address but not relating to a packet data connection on said list or on said second list nor to opening of a packet data connection, for processing in the network element; and means 805 for detecting, based on said distribution decisions, in received data packets sixth data packets, a sixth data packet being a data packet relating to said cluster network address but not relating to a packet data connection on said list or on said second list nor to opening of a packet data connection, to be processed in said at least second network element.

Furthermore, in the network element 810 said list and said second list comprise timing information for determining how long an opened packet data connection is valid. Said means 704 for maintaining said list is arranged to add a packet data connection relating to a first data packet or a fifth data packet to said list; update timing information in said list, when a second data packet is selected; and remove an opened packet data connection from said list, when a predefined time period from the arrival of the latest data packet relating to said packet data connection is exceeded. Said means 802 for maintaining said second list are arranged to add a packet data connection relating to a third data packet or a sixth data packet to said second list; update timing information in said second list, when a fourth data packet is detected; and remove an opened packet data connection from said second list, when a predefined time period from the arrival of the latest data packet relating to said packet data connection is exceeded.

In FIG. 8, the means 702 for determining distribution decisions is illustrated twice in order not to make the figure any more complex. Typically said list and said second list comprise entries corresponding to opened packet data connections. In this case said means 704 for maintaining said list is arranged to add an entry representing an opened packet data connection to said list when a first data packet or a fifth data packet is selected for processing in the network element; to update said timing information at least when a second data packet is selected; and to remove an entry from said list, when a predefined time period from the arrival of the latest data packet relating to said entry is exceeded. The means 802 for maintaining said second list is arranged to add an entry representing an opened packet data connection to said second list when a third data packet or a sixth data packet is detected; to update said timing information at least when a fourth data packet is detected; and to remove an entry from said second list, when a predefined time period from the arrival of the latest data packet relating to said entry is exceeded. The network element 810 may further comprise means for determining the status of an opened packet data connection. In this case entries of said list and said second list comprise status information, and said means 704, 802 for maintaining said list and said second list are arranged to update said status information according to a determined status. The predefined time period for removing an entry from the list or from the second list may be status specific.

Above network elements according to some embodiments of the invention are described. A network element in accordance with the invention may be arranged to operate in accordance with any method according to the invention. Examples of such methods are those discussed above in detail.

Figure 9:
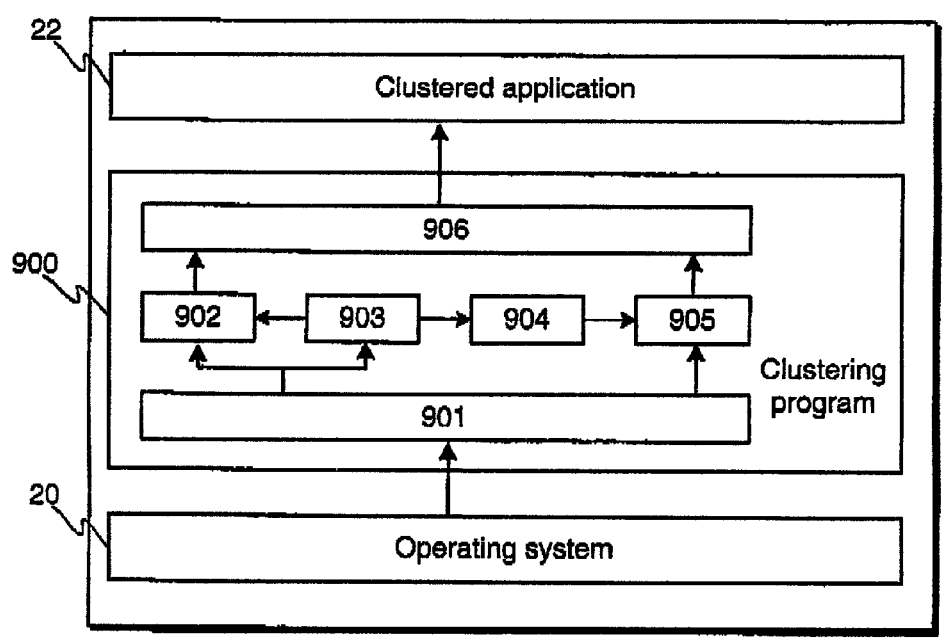
FIG. 9 illustrates schematically clustering software in accordance with the invention.

FIG. 9 illustrates schematically a clustering computer program or a computer program component 900 for a network element, which is adapted to serve as a node in a network element cluster. Such a cluster has a plurality of network element nodes and a cluster network address common to said plurality of network element nodes. Computer program (component) 900 comprises programs code means for:

receiving 901 data packets from an operating system, determining 902 distribution decisions for at least some of received data packets, selecting 903 according to said distribution decisions from those received data packets, which initiate opening of packet data connection to said cluster network address, first data packets, maintaining 904 a list about opened packet data connections based at least on said first data packets, selecting 905, based on said list, from received data packets second data packets, which are data packets relating to opened connections on said list, and delivering 906 selected data packets to a second computer program component for processing.

It is possible that selected data packets are delivered to the second computer program component via some higher level parts of the operating system, but this is not illustrated in the figure for tie sake of clarity.

A computer program product according to the invention comprises program code means stored on a computer readable medium for performing the steps of:

receiving data packets from an operating system, determining distribution decisions for at least some of received data packets, selecting, according to said distribution decisions, from those received data packets, which initiate opening of packet data connection to said cluster network address, first data packets, maintaining a list about opened packet data connections based at least on said first data packets, selecting, based on said list, from received data packets second data packets, which are data packets relating to opened connections on said list, and delivering selected data packets to a second computer program component for processing, when said program product is run on a computer.

A computer program product and a computer program (component) in accordance with the invention may be arranged to operate in accordance with any method according to the invention.

In view of the foregoing description it will be evident to a person skilled in the art that various modifications may be made within the scope of the invention. While preferred embodiments of the invention have been described in detail, it should be apparent that many modifications and variations thereto are possible, all of which fall within the scope of the invention.

The invention claimed is:

1. A method for processing data packets within a network element cluster having a plurality of network element nodes, said network element cluster having a cluster network address common to said plurality of nodes, said method comprising the steps of:

determining distribution decisions for first data packets, a first data packet being a data packet initiating opening of a packet data connection to said cluster network address, according to predetermined criteria, selecting from said first data packets for each node of the network element cluster those first data packets, which are to be processed in said node, according to the distribution decisions, maintaining node-specific lists about opened packet data connections for which a node is responsible, and selecting from second data packets, a second data packet being a data packet relating to an opened packet data connection specified in a node-specific list, for each node of the network element cluster those second data packets, which relate to connections on the node-specific list of said node, and wherein said node-specific list comprises timing information for determining how long an opened packet data connection is valid, and said maintaining comprises the substeps of:

updating said timing information, when a node for processing a second data packet is selected, removing an entry representing an opened packet data connection from said node-specific list, when a predefined time period from the receiving of the latest data packet relating to said packet data connection is exceeded.

2. A method according to claim 1, wherein each node of the network element cluster receives all data packets directed to the cluster network address and selects which data packets are processed in that node, on the basis of the distribution decisions or on the basis of the node-specific list.

3. A method according to claim 1, said maintaining comprising the substeps of:

adding an entry representing a new packet data connection to the node-specific list of that node, in which a first data packet is selected to be processed, and removing, after receiving in said network element cluster such a second data packet, which is further a data packet relating to closing of a packet data connection, an entry representing an opened packet data connection from a corresponding node-specific list.

4. A method according to claim 1, comprising the step of:
determining the status of an opened packet data connection, and wherein status information indicating the determined status of an opened packet data connection is maintained in said node-specific list.

5. A method according to claim 1, wherein for each node a node-specific list of opened packet data connections, for which the node is responsible, is maintained, said method further comprising the steps of:
maintaining for each node a second node-specific list of opened packet data connections, for which other nodes of the network element cluster are responsible,
determining distribution decisions for third data packets, a third data packet being a data packet relating to said cluster network address but neither a data packet relating to an opened packet data connection on a node-specific list or on a second node-specific list nor a data packet initiating opening of a packet data connection, according to said predetermined criteria,
selecting from said third data packets for each node of the network element cluster those third data packets, which are to be processed in said node, according to the distribution decisions, and
updating for each node either the node-specific list or the second node-specific list when selecting to process a third data packet in a node of the network element cluster,
and wherein
for each node the second node-specific list is updated when selecting to process a first data packet in another node, and
for each node the second node-specific list is updated when selecting to process a second data packet in another node.

6. A method according to claim 5, wherein said node-specific lists and said second node-specific lists comprise timing information for determining how long an opened packet data connection is valid, and said maintaining the node-specific lists and second node-specific lists comprises the substeps of:
adding an entry representing a new packet data connection to the node-specific list of that node, in which a first data packet is selected to be processed, and to the second node-specific lists of the other nodes,
adding an entry representing the packet data connection to the node-specific list of that node, in which a third data packet is selected to be processed, and to the second node-specific lists of the other nodes,
updating said timing information in the node-specific lists and second node-specific lists based on a selection of a node for processing a second data packet, and
removing an entry representing an opened packet data connection from said node-specific lists and said second node-specific lists, when a predefined time period from the receiving of the latest data packet relating to said packet data connection is exceeded.

7. A method according to claim 6, comprising the step of:
determining the status of an opened packet data connection, and wherein
status information indicating the determined status of an opened packet data connection is maintained in said node-specific lists and second node-specific lists, and
the status information in an entry relating to a third data packet depends on the type of the third data packet.

8. A method according to claim 7, wherein a plurality of status indications are used and said predefined time periods are status indication specific.

9. A method according to claim 8, wherein at least three status indications are used, a first status indication corresponding to a packet data connection, for which so far only a first data packet is being detected, a second status indication corresponding to a packet data connection, for which additionally at least one further data packet is being detected, and a third status indication corresponding to a packet data connection, for which a packet data relating to closing of said packet data connection is being detected.

10. A method according to claim 9, wherein packet data connections are Transfer Control Protocol connections, the first data packet is a SYN packet, and the data packet relating to the closing of a packet data connection is either a FIN packet or a RST packet.

11. A method according to claim 1, wherein the distribution decisions are determined based on a hash value calculated for a data packet, said hash value being calculated using a hash function and certain header field(s) of said data packet and each node of said plurality of node having a node-specific set of hash values.

12. A method according to claim 11, wherein said header fields comprise the source and destination address fields of Internet Protocol data packet header and the source and destination port fields of a Transfer Control Protocol data packet header.

13. A method according to claim 11, wherein said header fields comprise the source and destination address fields of Internet Protocol data packet header and the source and destination port fields of a User Datagram Protocol data packet header.

14. A method according to claim 11, further comprising the step of:
updating the node-specific sets of hash values.

15. A method according to claim 1, further comprising the step of:
updating said predetermined criteria.

16. A method for processing data packets within a network element cluster having a plurality of network element nodes, said network element cluster having a cluster network address common to said plurality of nodes, said method comprising the steps of:
determining distribution decisions for first data packets, a first data packet being a data packet initiating opening of a packet data connection to said cluster network address, according to predetermined criteria,
selecting from said first data packets for each node of the network element cluster those first data packets, which are to be processed in said node, according to the distribution decisions,
maintaining node-specific lists about opened packet data connections for which a node is responsible, and
selecting from second data packets, a second data packet being a data packet relating to an opened packet data connection specified in a node-specific list, for each node of the network element cluster those second data packets, which relate to connections on the node-specific list of said node,
and wherein said node-specific list comprises timing information for determining how long an opened packet data connection is valid, and said maintaining comprising the substeps of:
adding an entry representing a new packet data connection to the node-specific list of that node, in which a first data packet is selected to be processed,
updating said timing information, when a node for processing a second data packet is selected, and removing an entry representing an opened packet data connection from said node-specific list, when a predefined time period from the receiving of the latest data packet relating to said packet data connection is exceeded.

17. A method according to claim 16, comprising the step of:

determining the status of an opened packet data connection, and wherein status information indicating the determined status of an opened packet data connection is maintained in said node-specific list.

18. A method according to claim 17, wherein a plurality of status indications are used and said predefined time periods are status indication specific.

19. A method according to claim 18, wherein at least three status indications are used, a first status indication corresponding to a packet data connection, for which so far only a first data packet is being detected, a second status indication corresponding to a packet data connection, for which additionally at least one further data packet is being detected, and a third status indication corresponding to a packet data connection, for which a packet data relating to closing of said packet data connection is being detected.

20. A method according to claim 19, wherein packet data connections are Transfer Control Protocol connections, the first data packet is a SYN packet, and the data packet relating to the closing of a packet data connection is either a FIN packet or a RST packet.

21. A cluster of network element nodes, said cluster having a plurality of nodes and a cluster network address common to said plurality of nodes, said cluster further comprising:

means for receiving data packets relating to said cluster network address, means for determining distribution decisions for received first data packets, a first data packet being a data packet initiating opening of a packet data connection to said cluster network address, according to predetermined criteria which involve a node-specific set of hash values allocated to each of said plurality of nodes, means for selecting from said first data packets for each node of the network element cluster those first data packets, which are to be processed in said node according to the distribution decisions based on hash values calculated from the first data packets and said node-specific set of hash values allocated to said node, means for maintaining node-specific lists about opened packet data connections for which a node is responsible, means for selecting from received second data packets, a second data packet being a data packet relating to an opened packet data connection specified in a node-specific list, for each node of the network element cluster those second data packets, which relate to opened connections on the node-specific list of said node, irrespective whether said predetermined criteria are updated or changed subsequent to opening said connections on the node-specific list of said node with a result that hash values calculated from said second packets do not fall into a node-specific set of hash values allocated to said node according to said updated or changed criteria, and means for sending to each node of said network element cluster data packets selected for the node, and wherein entries of said list comprise timing information for determining how long the opened packet data connection is valid and said means for maintaining said list is arranged to add an entry representing an opened packet data connection to said list when a first data packet is selected for processing in the network element, update said timing information at least when a second data packet is selected, and remove an entry from said list, when a predefined time period from the arrival of the latest data packet relating to said entry is exceeded.

22. A cluster according to claim 21, further comprising means for updating said predetermined criteria.

23. A network element for constructing a cluster of network element nodes, said cluster having a plurality of network element nodes and a cluster network address common to said plurality of network element nodes, said network element comprising:

means for receiving data packets, means for determining distribution decisions for at least some of received data packets according to predetermined criteria, means for selecting, based on distribution decisions, from those received data packets, which are data packets initiating opening of packet data connection to said cluster network address, first data packets for processing in the network element, means for maintaining a list about opened packet data connections in the network element, and means for selecting, based on said list, from received data packets second data packets, a second data packet being a data packet relating to an opened connection on said list, for processing in the network element, and wherein entries of said list comprise timing information for determining how long the opened packet data connection is valid and said means for maintaining said list is arranged to add an entry representing an opened packet data connection to said list when a first data packet is selected for processing in the network element, update said timing information at least when a second data packet is selected, and remove an entry from said list, when a predefined time period from the arrival of the latest data packet relating to said entry is exceeded.

24. A network element according to claim 23, further comprising means for updating said predetermined criteria.

25. A network element according to claim 23, further comprising means for detecting a second data packet, which is a data packet relating to closing of a packet data connection, wherein said means for maintaining said list is arranged to remove an entry from said list, when a second data packet relating to closing of a packet data connection is detected.

26. A network element according to claim 23, further comprising means for determining the status of an opened packet data connection, wherein entries of said list comprise status information and said means for maintaining said list is arranged to update said status information according to a determined status.

27. A network element according to claim 26, wherein said predefined time period is status specific.

28. A network element according to claim 23, further comprising means for detecting, based on distribution decisions according to predetermined criteria, from received data packets, which are data packets initiating opening of packet data connections, third data packets to be processed in at least a second network element, means for maintaining a second list about opened packet data connections in said at least second network element, means for detecting from received data packets fourth data packets, a fourth data packet being a data packet relating to an opened connection on said second list, means for selecting, based on distribution decisions, from received data packets fifth data packets, a fifth data packet being a data packet relating to said cluster network address but neither a data packet relating to a packet data connection on said list or on said second list nor a data packet initiating opening of a packet data connection, for processing in the network element, and means for detecting, based on said distribution decisions, in received data packets sixth data packets, a sixth data packet being a data packet relating to said cluster network address but neither a data packet relating to a packet data connection on said list or on said second list nor a data packet initiating opening of a packet data connection, to be processed in said at least second network element, wherein said list and said second list comprise timing information for determining how long an opened packet data connection is valid, said means for maintaining said list is arranged to add a packet data connection relating to a first data packet or a fifth data packet to said list; update timing information in said list, when a second data packet is selected; and remove an opened packet data connection from said list, when a predefined time period from the arrival of the latest data packet relating to said packet data connection is exceeded, and said means for maintaining said second list are arranged to add a packet data connection relating to a third data packet or a sixth data packet to said second list; update timing information in said second list, when a fourth data packet is detected; and remove an opened packet data connection from said second list, when a predefined time period from the arrival of the latest data packet relating to said packet data connection is exceeded.

29. A network element according to claim 28, wherein said list and said second list comprise entries corresponding to opened packet data connections and said means for maintaining said list is arranged to add an entry representing an opened packet data connection to said list when a first data packet or a fifth data packet is selected for processing in the network element, and said means for maintaining said second list is arranged to add an entry representing an opened packet data connection to said second list when a third data packet or a sixth data packet is detected, update said timing information at least when a fourth data packet is detected, and remove an entry from said second list, when a predefined time period from the arrival of the latest data packet relating to said entry is exceeded.

30. A network element according to claim 28, further comprising means for determining the status of an opened packet data connection, wherein entries of said list and said second list comprise status information, said means for maintaining said list is arranged to update said status information according to a determined status and said means for maintaining said second list is arranged to update said status information according to a determined status.

31. A network element according to claim 30, wherein said predefined time period is status specific.

32. A network element cluster comprising a plurality of network element nodes, said cluster having a cluster network address common to said plurality of network element nodes and each network element comprising:

means for receiving data packets, means for determining distribution decisions for at least some of the received data packets according to predetermined criteria, means for selecting, based on the distribution decisions, from those received data packets, which are data packets initiating opening of packet data connection to said cluster network address, first data packets for processing in the network element, means for maintaining a list about opened packet data connections in the network element, and means for selecting, based on said list, from the received data packets second data packets, a second data packet being a data packet relating to an opened connection on said list, for processing in the network element, irrespective whether said predetermined criteria are updated or changed subsequent to opening said connections on the list of the network element, and wherein entries of said list comprise timing information for determining how long the opened packet data connection is valid and said means for maintaining said list is arranged to add an entry representing an opened packet data connection to said list when a first data packet is selected for processing in the network element, update said timing information at least when a second data packet is selected, and remove an entry from said list, when a predefined time period from the arrival of the latest data packet relating to said entry is exceeded.

33. A computer program component comprising a computer program code means stored on a computer readable medium for a network element, said network element being a network element for constructing a cluster of network element nodes, said cluster having a plurality of network element nodes and a cluster network address common to said plurality of network element nodes, said computer program component comprising computer program code means for:

receiving data packets from an operating system, determining distribution decisions for at least some of the received data packets according to predetermined distribution criteria, selecting according to said distribution decisions from those received data packets, which initiate opening of packet data connection to said cluster network address, first data packets, maintaining a list about opened packet data connections based at least on said first data packets, selecting, based on said list, from received data packets second data packets, which are data packets relating to opened connections on said list, irrespective whether said predetermined distribution criteria are updated or changed subsequent to opening said connections on the list of the network element with a result that hash values calculated from said second packets do not fall into a node-specific set of hash values allocated to said network element according to said updated or changed distribution criteria, and delivering selected data packets to a second computer program component for processing.

34. A computer program product comprising computer program code means stored on a computer readable medium for a network element, said network element being a network element for constructing a cluster of network element nodes, said cluster having a plurality of network element nodes and a cluster network address common to said plurality of network element nodes, for performing the steps of:

receiving data packets from an operating system, determining distribution decisions for at least some of the received data packets according to predetermined criteria, selecting, according to said distribution decisions, from those received data packets, which initiate opening of a packet data connection to said cluster network address, first data packets, maintaining a node specific list about opened packet data connections based at least on said first data packets, selecting, based on said list, from received data packets second data packets, which are data packets relating to opened connections on said list, and wherein said node-specific list comprises timing information for determining how long an opened packet data connection is valid, and said maintaining comprises the substeps of:

updating said timing information, when a node for processing a second data packet is selected, removing an entry representing an opened packet data connection from said node-specific list, when a predefined time period from the receiving of the latest data packet relating to said packet data connection is exceeded, and delivering selected data packets to a second computer program product for processing, when said program product is run on a computer.

* * * * *